United States Patent
Rusin et al.

(10) Patent No.: US 11,227,425 B2
(45) Date of Patent: *Jan. 18, 2022

(54) EMULATION OF GEOMETRY SHADERS AND STREAM OUTPUT USING COMPUTE SHADERS

(71) Applicant: VMware, Inc., Palo Alto, CA (US)

(72) Inventors: Zack Rusin, Palo Alto, CA (US); Jose Fonseca, London (GB)

(73) Assignee: VMWARE, INC., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/869,364

(22) Filed: May 7, 2020

(65) Prior Publication Data
US 2020/0265631 A1    Aug. 20, 2020

Related U.S. Application Data

(63) Continuation of application No. 15/610,192, filed on May 31, 2017, now Pat. No. 10,685,473.

(51) Int. Cl.
*G06T 15/00* (2011.01)
*G06F 9/455* (2018.01)

(52) U.S. Cl.
CPC ........ *G06T 15/005* (2013.01); *G06F 9/45545* (2013.01)

(58) Field of Classification Search
None
See application file for complete search history.

(56) References Cited

U.S. PATENT DOCUMENTS

| | | | |
|---|---|---|---|
| 6,404,428 B1 * | 6/2002 | Radecki | G06T 15/00 345/419 |
| 6,704,021 B1 * | 3/2004 | Rogers | G06T 17/20 345/503 |
| 6,771,269 B1 * | 8/2004 | Radecki | G09G 5/363 345/503 |
| 7,447,873 B1 * | 11/2008 | Nordquist | G06F 9/30043 712/2 |
| 7,594,095 B1 * | 9/2009 | Nordquist | G06F 9/4843 712/22 |
| 7,746,347 B1 * | 6/2010 | Brown | G06F 8/41 345/522 |
| 7,958,498 B1 * | 6/2011 | Brown | G06T 15/005 717/139 |
| 8,134,566 B1 * | 3/2012 | Brown | G06T 15/04 345/522 |

(Continued)

*Primary Examiner* — Martin Mushambo (57) ABSTRACT

Techniques for emulating geometry shaders and stream output using compute shaders are provided. In one set of embodiments, a geometry shader/stream output (GS/SO) emulation module can receive a geometry shader defined by an application for execution via a geometry shader stage of a graphics processing unit (GPU) of a computer system, where the geometry shader comprises program code for processing an input primitive. The GS/SO emulation module can further convert the geometry shader into one or more compute shaders, where the one or more compute shaders incorporate the program code of the geometry shader. The GS/SO emulation module can then issue the one or more compute shaders to a graphics driver of the computer system for execution via a compute shader stage of the GPU.

21 Claims, 6 Drawing Sheets

(56) References Cited

U.S. PATENT DOCUMENTS

| | | | |
|---|---|---|---|
| 8,223,158 B1* | 7/2012 | Lindholm | G06T 1/20 345/506 |
| 8,704,842 B1* | 4/2014 | Gaddy | G06F 17/18 345/586 |
| 9,766,918 B2* | 9/2017 | Tsirkin | G06F 9/45558 |
| 2006/0227144 A1* | 10/2006 | Bleiweiss | G06T 13/20 345/502 |
| 2009/0051687 A1* | 2/2009 | Kato | G06T 11/40 345/426 |
| 2009/0141033 A1* | 6/2009 | Street | G06T 1/20 345/506 |
| 2009/0153570 A1* | 6/2009 | Jiao | G06T 15/005 345/501 |
| 2009/0182948 A1* | 7/2009 | Jiao | G06F 12/0864 711/133 |
| 2009/0295804 A1* | 12/2009 | Goel | G06T 15/005 345/426 |
| 2009/0322748 A1* | 12/2009 | Chen | G06T 15/08 345/424 |
| 2010/0214294 A1* | 8/2010 | Li | G06T 17/20 345/423 |
| 2010/0214301 A1* | 8/2010 | Li | G06T 1/20 345/522 |
| 2011/0043518 A1* | 2/2011 | Von Borries | G06T 11/40 345/419 |
| 2011/0063318 A1* | 3/2011 | Bolz | G06T 1/20 345/552 |
| 2011/0080415 A1* | 4/2011 | Duluk, Jr | G06F 9/3851 345/506 |
| 2011/0141112 A1* | 6/2011 | Hux | G06T 15/005 345/426 |
| 2011/0157195 A1* | 6/2011 | Sprangle | G06F 9/3836 345/522 |
| 2011/0242125 A1* | 10/2011 | Hall | G06T 1/20 345/582 |
| 2011/0304634 A1* | 12/2011 | Urbach | G06F 9/5016 345/501 |
| 2012/0229460 A1* | 9/2012 | Fortin | G06T 1/20 345/419 |
| 2013/0063439 A1* | 3/2013 | Marison | G06T 15/80 345/426 |
| 2013/0106889 A1* | 5/2013 | Lee | G06T 15/005 345/582 |
| 2013/0181998 A1* | 7/2013 | Malakapalli | G06F 9/45558 345/503 |
| 2013/0181999 A1* | 7/2013 | Malakapalli | G06T 15/005 345/506 |
| 2013/0215117 A1* | 8/2013 | Glaister | G06F 8/456 345/426 |
| 2013/0229421 A1* | 9/2013 | Cheng | G06T 1/20 345/522 |
| 2013/0265309 A1* | 10/2013 | Goel | G06T 15/00 345/426 |
| 2013/0293544 A1* | 11/2013 | Schreyer | G06T 15/005 345/426 |
| 2013/0300754 A1* | 11/2013 | Everitt | G06T 15/005 345/522 |
| 2013/0328895 A1* | 12/2013 | Sellers | G06T 1/20 345/522 |
| 2014/0043341 A1* | 2/2014 | Goel | G06T 1/00 345/501 |
| 2014/0132613 A1* | 5/2014 | Lassen | G06T 15/005 345/522 |
| 2014/0204080 A1* | 7/2014 | Goel | G06T 1/60 345/419 |
| 2014/0210819 A1* | 7/2014 | Mei | G06T 15/005 345/423 |
| 2014/0354660 A1* | 12/2014 | Balci | G06F 9/5022 345/522 |
| 2014/0362081 A1* | 12/2014 | Cerny | G06T 15/40 345/426 |
| 2014/0362102 A1* | 12/2014 | Cerny | G06T 1/60 345/589 |
| 2015/0042664 A1* | 2/2015 | Currid | G06F 9/46 345/502 |
| 2015/0084981 A1* | 3/2015 | Clarberg | G06T 11/40 345/614 |
| 2015/0269065 A1* | 9/2015 | Bourd | G06F 12/023 711/155 |
| 2015/0287165 A1* | 10/2015 | Berghoff | G06T 15/80 345/426 |
| 2015/0287167 A1* | 10/2015 | Cerny | G06T 3/40 345/423 |
| 2015/0287232 A1* | 10/2015 | Cerny | G06T 1/20 345/501 |
| 2015/0287239 A1* | 10/2015 | Berghoff | G06T 15/005 345/422 |
| 2015/0348317 A1* | 12/2015 | Hakura | G06T 15/005 345/426 |
| 2016/0055667 A1* | 2/2016 | Goel | G06T 15/005 345/522 |
| 2016/0358307 A1* | 12/2016 | Brothers | G09G 5/024 |
| 2016/0364831 A1* | 12/2016 | Spanton | G06F 9/4552 |
| 2017/0061569 A1* | 3/2017 | Sathe | G06T 1/60 |
| 2017/0228850 A1* | 8/2017 | Gordon | G06F 9/455 |
| 2017/0263040 A1* | 9/2017 | Surazhsky | G06T 15/005 |
| 2017/0293995 A1* | 10/2017 | Saleh | G06T 15/005 |
| 2018/0350027 A1 | 12/2018 | Rusin et al. | |

\* cited by examiner

EMULATION OF GEOMETRY SHADERS AND STREAM OUTPUT USING COMPUTE SHADERS

CROSS REFERENCE TO RELATED APPLICATIONS

This application is a continuation application and, pursuant to 35 U.S.C. § 120, is entitled to and claims the benefit of earlier filed application U.S. application Ser. No. 15/610,192 filed May 31, 2017, now U.S. Pat. No. 10,685,473 issued Jun. 16, 2020, the content of which is incorporated herein by reference in its entirety for all purposes.

BACKGROUND

Modern graphics processing units (GPUs) implement a programmable hardware pipeline, referred to herein as a "graphics pipeline" or "GPU pipeline," for rendering real-time 3D graphics. Applications invoke high-level graphics APIs, such as Direct3D and OpenGL, to configure this pipeline and to provide shaders, which are programs for performing application-specific graphics or compute operations (e.g., per-vertex processing, per-pixel processing, etc.). Drivers implementing the graphics APIs translate the application-provided API calls and shaders into instructions that are executed by GPU hardware.

Figure 1:
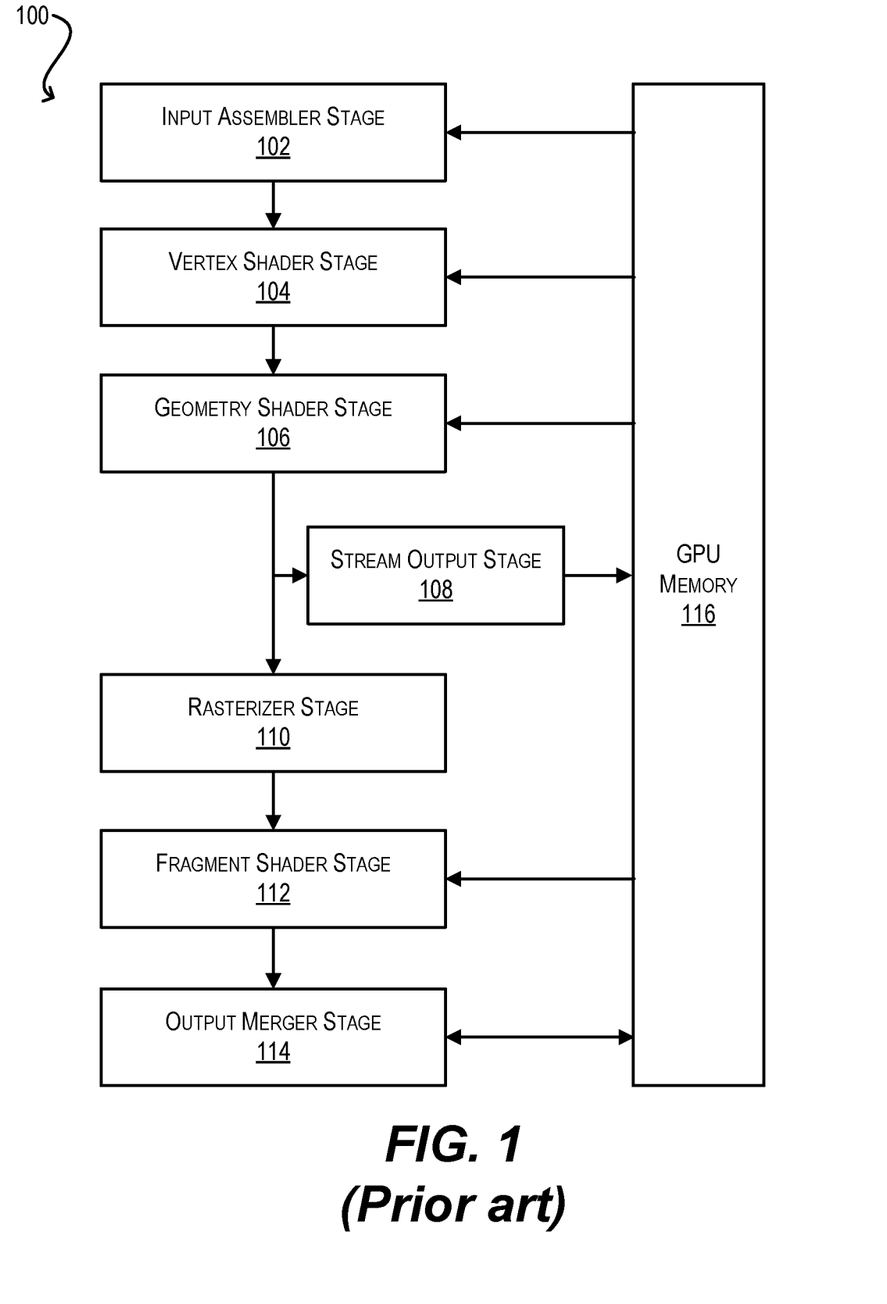
FIG. 1 depicts an example graphics pipeline.

By way of example, FIG. 1 is a functional block diagram of a graphics pipeline 100 that is compliant with Direct3D version 10 and OpenGL version 3.3. As shown, graphics pipeline 100 includes an input assembler stage 102, a vertex shader stage 104, a geometry shader stage 106, a stream output stage 108, a rasterizer stage 110, a fragment shader stage 112, and an output/merger stage 114. Stages 102-114 interact with memory resources (e.g., buffers) 116 maintained on the GPU. The general functions performed by each pipeline stage are summarized below:

- Input assembler stage 102—provides input data, such as triangles, lines, and points, to the rest of graphics pipeline 100
- Vertex shader stage 104—executes application-defined vertex shaders for performing per-vertex computations (e.g., transformation, lighting, etc.); each vertex shader takes as input a single vertex and outputs a single vertex
- Geometry shader stage 106—executes application-defined geometry shaders for performing per-primitive computations; each geometry shader takes as input a single, fully-formed primitive (e.g., three vertices for a triangle, two vertices for a line, one vertex for a point) and either discards the primitive or outputs one or more new primitives
- Stream output stage 108—streams primitive data from geometry shader stage 106 (or vertex shader stage 104) to one or more output buffers in GPU memory 116; data that is streamed out in this manner can be accessed by the graphics application and/or recirculated back into graphics pipeline 100 as input data
- Rasterizer stage 110—converts scene data, which comprises vector information (e.g., primitives), into a raster image comprising pixels; as part of this process, rasterizer stage 110 invokes fragment shader stage 112
- Fragment shader stage 112—executes application-defined fragment shaders for performing per-pixel operations (e.g., determining pixel color, pixel depth, etc.); each fragment shader receives as input various types of data pertaining to a particular pixel (e.g., texture data, interpolated per-vertex data, constants, etc.) and outputs color and/or depth values for the pixel
- Output merger stage 114—combines the output of the rasterizer/fragment shader stages with the existing contents of a given render target or framebuffer to generate a final pipeline result (e.g., completed frame)

Of the graphics pipeline stages shown in FIG. 1, some GPU vendors intentionally exclude implementations of geometry shader stage 106 and stream output stage 108 in their GPUs (or certain classes of their GPUs) for various reasons, such as design complexity, cost, power draw, and so on. As a result, graphics APIs that are designed to interoperate with these GPUs also exclude support for these stages. For example, Apple Inc.'s Metal API does not provide any functions for defining/executing geometry shaders or configuring stream output and assumes that these features are absent in the underlying GPU hardware.

The foregoing creates problems in various scenarios, such as when virtualizing a computer system that runs guest applications reliant on geometry shaders/stream output (e.g., Direct3D 10 or OpenGL 3.3 applications) on a host system that uses a host graphics API/driver without support for these features (e.g. Metal). In this scenario, if a guest application of the virtual machine (VM) issues an API call for executing a geometry shader, the hypervisor of the host system cannot simply pass the geometry shader to the host graphics driver for handling since the host graphics driver does not understand this feature (and the host GPU may not natively support it).

One way to work around this problem is for the hypervisor to execute the geometry shader in software via the host system's central processing unit (CPU). However, CPU-based geometry shader execution can significantly degrade rendering performance due to the need for synchronization and data transfers between the CPU and GPU. Thus, this approach is generally impractical for interactive/real-time graphics rendering.

SUMMARY

Techniques for emulating geometry shaders and stream output using compute shaders are provided. In one set of embodiments, a geometry shader/stream output (GS/SO) emulation module can receive a geometry shader defined by an application for execution via a geometry shader stage of a graphics processing unit (GPU) of a computer system, where the geometry shader comprises program code for processing an input primitive. The GS/SO emulation module can further convert the geometry shader into one or more compute shaders, where the one or more compute shaders incorporate the program code of the geometry shader. The GS/SO emulation module can then issue the one or more compute shaders to a graphics driver of the computer system for execution via a compute shader stage of the GPU.

The following detailed description and accompanying drawings provide a better understanding of the nature and advantages of particular embodiments.

DETAILED DESCRIPTION

In the following description, for purposes of explanation, numerous examples and details are set forth in order to provide an understanding of various embodiments. It will be evident, however, to one skilled in the art that certain embodiments can be practiced without some of these details, or can be practiced with modifications or equivalents thereof.

1. Overview

Embodiments of the present disclosure provide techniques for emulating the execution of geometry shaders and stream output on a GPU using the GPU's compute shader stage. As known in the art, this compute shader stage (which is implemented in most modern GPUs and supported by most modern graphics APIs like Direct3D, OpenGL, and Metal) enables the GPU to execute application-defined programs, referred to as "compute shaders," in a manner that is roughly similar to other programmable shader stages that are part of the GPU's graphics pipeline. However, unlike vertex, geometry, or fragment shaders, compute shaders are not tied to a specific graphics pipeline task; instead, they can comprise general purpose code, the results of which can be fed back to the calling application. Thus, the compute shader stage allows the GPU to perform arbitrary computations like a general purpose processor.

At a high level, the techniques described herein leverage the computational flexibility afforded by the GPU's compute shader stage to effectively repurpose the compute shader stage as a pseudo-geometry shader (and/or stream output) stage. Stated another way, these techniques convert the geometry shaders (and stream output commands) that are provided/invoked by applications into corresponding compute shaders which are then run on the GPU's compute shader hardware. This approach has two distinct advantages. First, it allows any graphics driver and GPU combination that supports compute shaders to also handle geometry shaders and stream output, even though the graphics driver/GPU may not natively support these features. For example, in a virtualization context, this approach enables a host graphics driver that does not have support for geometry shaders/stream output (e.g., a Metal driver) to nevertheless accept and process geometry shader/stream output-related operations from guest applications in the form of compute shader API calls. In these embodiments, a geometry shader/stream output emulation module may be provided in the host system's hypervisor that converts the geometry shader/stream output API calls invoked by the guest applications into corresponding compute shader API calls that are consumed by the host graphics driver and ultimately executed by the GPU's compute shader stage.

Second, since the techniques of the present disclosure emulate the execution of geometry shaders and stream output on the GPU itself (rather than on the system CPU), the performance overhead of performing CPU-based geometry shader emulation is avoided. In certain embodiments, these techniques can achieve a level of rendering performance that is almost equal to GPUs with dedicated geometry shader and stream output stages. As a result, these techniques are well-suited for use with interactive/real-time graphics applications.

The foregoing and other aspects of the present disclosure are described in further detail below.

2. Example Computer Systems and High-Level Flow

Figure 2:
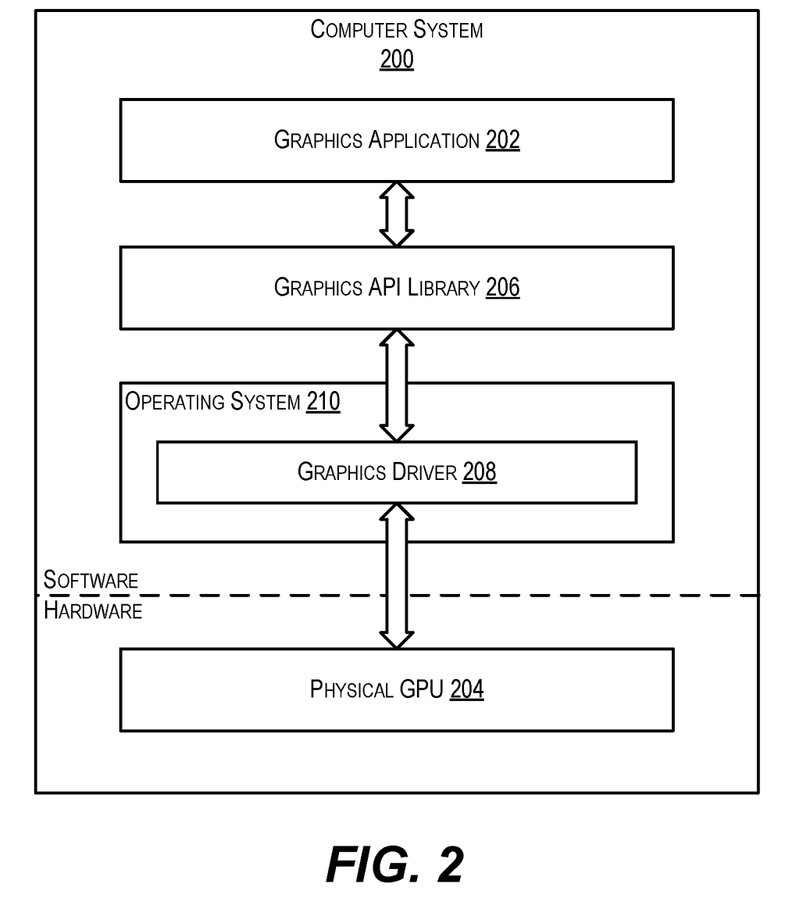
FIG. 2 depicts an example computer system.

To provide context for the embodiments described herein, FIG. 2 depicts an example computer system 200 that comprises a graphics application 202 such as a video game, a computer-assisted design (CAD) application, a visualization application, or the like. Graphics application 202 is configured to generate 3D graphics for presentation to a user of computer system 200 with the help of a physical GPU 204.

To carry out this task, graphics application 202 interacts with a graphics API library 206, which exposes a set of high-level functions that application 202 can invoke to control/configure the graphics pipeline of GPU 204. These functions include, e.g., functions for providing graphics resource data (e.g., vertices, textures, etc.) to the GPU pipeline, functions for configuring various rendering options/parameters, functions for providing shaders to the programmable stages of the GPU pipeline, and so on. As mentioned previously, examples of well-known graphics APIs include Direct3D, OpenGL, and Metal.

Upon being invoked by graphics application 202, graphics API library 206 communicates with a graphics driver 208 that is part of the computer system's operating system (OS) 210. Graphics driver 208 is responsible for translating the API (i.e., function) calls issued by graphics application 202 into corresponding instructions (i.e., GPU opcodes) that can be understood and executed by physical GPU 204. Thus, graphics driver 208 acts as a bridge between the high-level graphics functions exposed by graphics API library 206 and the machine-level code needed to execute those functions on the specific hardware architecture of GPU 204. Generally speaking, the graphics driver that is installed on computer system 200 will be configured to support/implement the graphics API type and version used by graphics application 202 in order for driver 208 to properly perform its duties. For example, if graphics application 202 makes use of Direct3D 10, graphics driver 208 will be configured to support/implement Direct3D 10 in order to recognize and accept the Direct3D 10 functions that may be invoked by application 202.

Finally, GPU 204 executes, via its graphics pipeline, the instructions that are provided by graphics driver 208 and thereby generates rendered frames on behalf of graphics application 202 that can be presented to a user.

In some scenarios, computer system 200 may be virtualized (i.e., run as a VM) on a host system. In these cases, the graphics rendering path for application 202 becomes more complicated due to the inclusion of a hypervisor between the VM and the host system's GPU hardware. An example of such a scenario is depicted in FIG. 3A according to an embodiment.

Figure 3A:
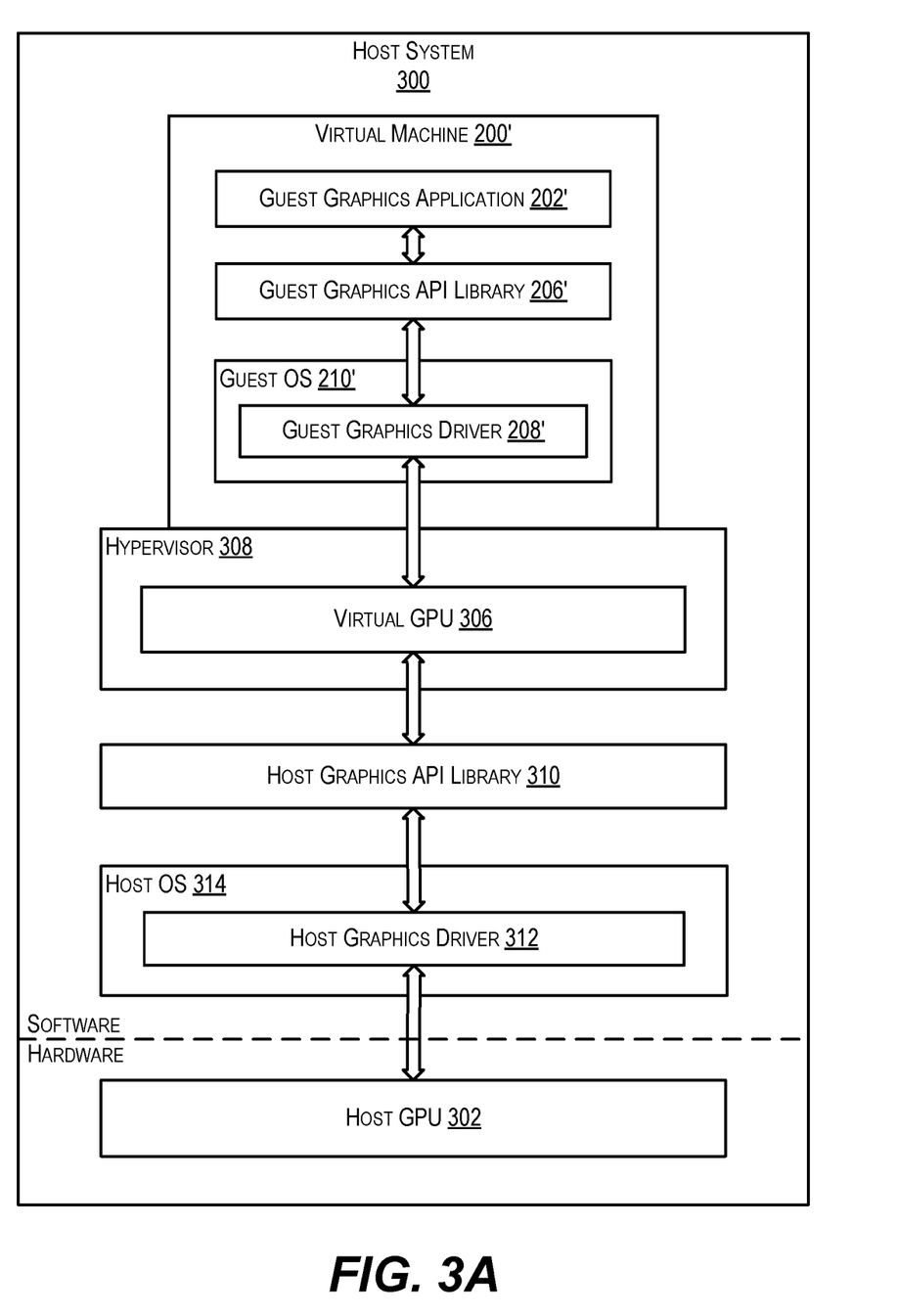
FIG. 3A depicts an example host system.

In the example of FIG. 3A, computer system 200 of FIG. 2 is implemented as a VM 200' running on a host system 300. Like computer system 200, VM 200' includes a guest graphics application 202' that invokes a guest graphics API library 206' for the purpose of generating 3D graphics. Guest graphics API library 206' in turn interacts with a guest graphics driver 208' (within guest OS 210') that is matched to the type and version of library 206'.

However, rather than communicating directly with a physical GPU (i.e., host GPU) 302 of host system 300, guest graphics driver 208' communicates with a software-based virtual GPU 306 that is implemented within a hypervisor 308 of host system 300. Virtual GPU 306 is responsible for accepting, from guest graphics driver 208', graphics API calls issued by guest graphics application 202' that are exposed by guest graphics API library 206' and translating those API calls into corresponding API calls for a host graphics API library 310 that is implemented via a host graphics driver 312 of host system 300. For example, if guest graphics API library 206' is Direct3D and host graphics API library 310 is Metal, virtual GPU 306 translates the Direct3D API calls issued by guest graphics application 202' into corresponding Metal API calls (note that this assumes guest graphics driver 208' is paravirtualized and passes through the application-invoked API calls directly to virtual GPU 306).

Host graphics driver 312, which is part of a host OS 314, then converts the translated API calls provided by virtual GPU 306 into GPU opcodes that can be executed in hardware on host GPU 302.

As noted in the Background section, one potential problem with the virtualized scenario shown in FIG. 3A is that guest graphics API library 206' may be an API that supports/exposes geometry shader and stream output functionality (e.g., Direct3D 10 or OpenGL 3.3), while host graphics API library 310 may be an API that explicitly excludes support for these features (e.g., Metal). In this case, virtual GPU 306 cannot directly translate geometry shader and stream output-related API calls that are invoked by guest graphics application 202' into corresponding host graphics API calls, since host graphics API library 310 does not provide any geometry shader/stream output functions. One workaround is for virtual GPU 306 to execute the geometry shaders and stream output commands provided by guest graphics application 202' in software on the CPU of host system 300 (not shown). However, the performance overhead of this CPU-based approach is too high for it to be practical for real-time/interactive graphics rendering.

Figure 3B:
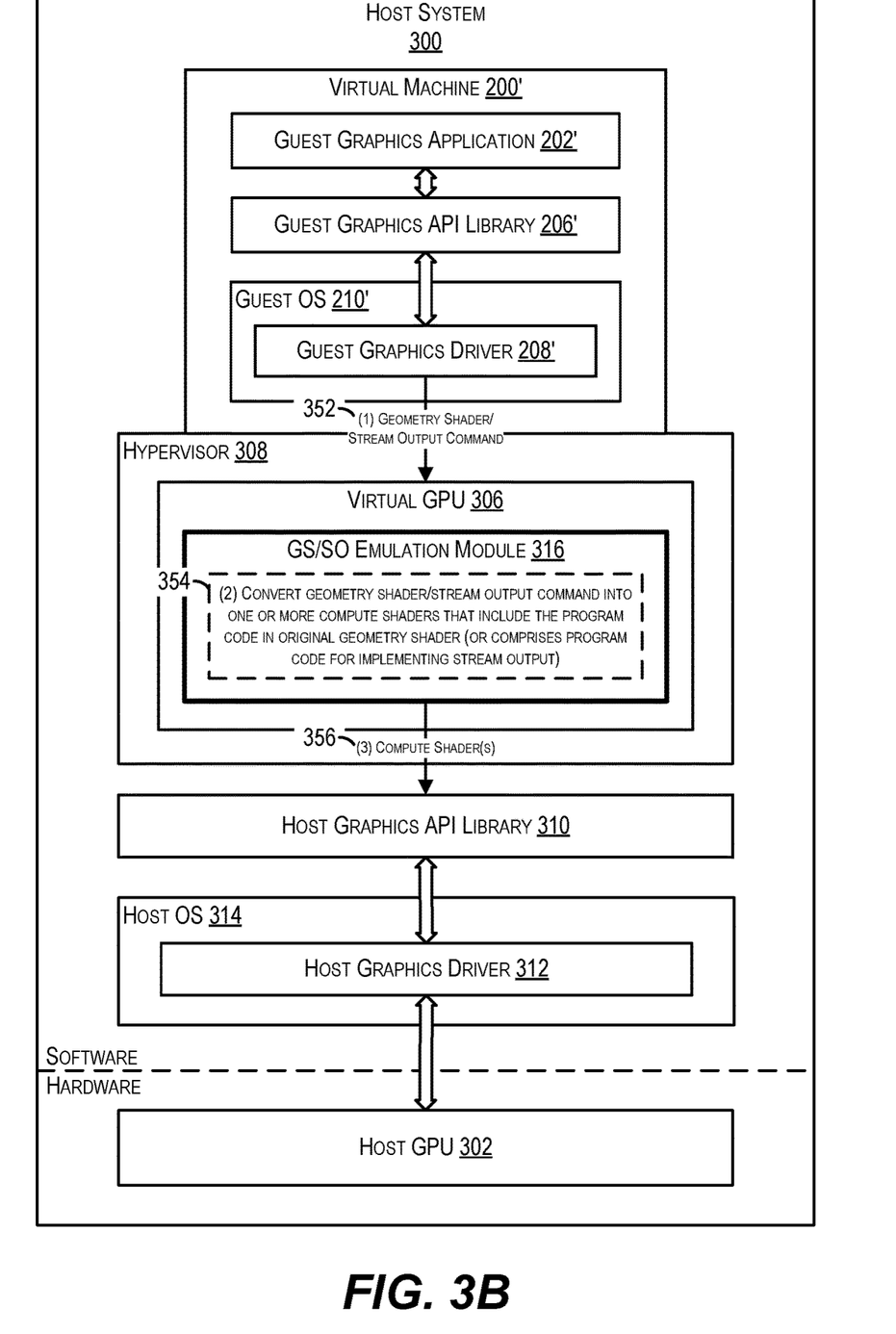
FIG. 3B depicts an example host system comprising a geometry shader/stream output emulation module according to an embodiment.

To address the foregoing and other similar problems, FIG. 3B depicts an enhanced version of host system 300 that includes, within virtual GPU 306, a novel geometry shader/stream output (GS/SO) emulation module 316. GS/SO emulation module 316 assumes that host graphics API library 310 and host graphics driver 312, as well as host GPU 302, support compute shader functionality—in other words, functionality for executing general purpose programs (i.e., compute shaders) on the hardware of host GPU 302. Most modern graphics APIs (including Direct3D, OpenGL, and Metal) and modern GPUs provide support for compute shaders or a variant thereof.

As shown in FIG. 3B, GS/SO emulation module 316 can receive a geometry shader or stream output command from guest graphics driver 208' that is invoked by guest application 202' via guest graphics API library 206' (step (1); reference numeral 352). In response, GS/SO emulation module 316 can convert the geometry shader/stream output command into one or more compute shaders that encapsulate the program code defined in (or implied by) the geometry shader/stream output command (step (2); reference numeral 354). Finally, GS/SO emulation module 316 can issue one or more API calls to host graphics driver 312 (in accordance with the interfaces exposed by host graphics API library 310) for executing the compute shader(s) created at step (2) on the compute shader hardware (i.e., compute shader stage) of host GPU 302 (step (3); reference numeral 356). With this high-level approach, module 316 can essentially emulate the execution of geometry shaders and stream output on host GPU 302 via the host GPU's compute shader stage. Detailed workflows for implementing steps (1)-(3) of FIG. 3A in the separate cases of (1) emulating a geometry shader and (2) emulating stream output are provided in the sections that follow.

It should be appreciated that FIGS. 2, 3A, and 3B are illustrative and not intended to limit the embodiments of the present disclosure. For instance, although FIG. 3B depicts a specific virtualization use case for GS/SO emulation module 316, the functionality of module 316 may also be applied to other contexts where GPU-based emulation of geometry shaders and stream output may be useful. As one example, consider a scenario where a graphics application is written to make use of OpenGL 3.3 only, but a user wishes to run the application on a computer system with a Metal graphics driver. In this scenario, GS/SO emulation module 316 may be incorporated into an intermediary "wrapper" layer that intercepts OpenGL geometry shader/stream output API calls issued by the application and translates them into corresponding Metal compute shader API calls. Thus, this wrapper would allow the OpenGL-based application to run on the computer system, despite the lack of an OpenGL driver. One of ordinary skill in the art will recognize other variations and possible use cases for the functionality provided by GS/SO emulation module 316.

3. Geometry Shader Emulation

Figure 4:
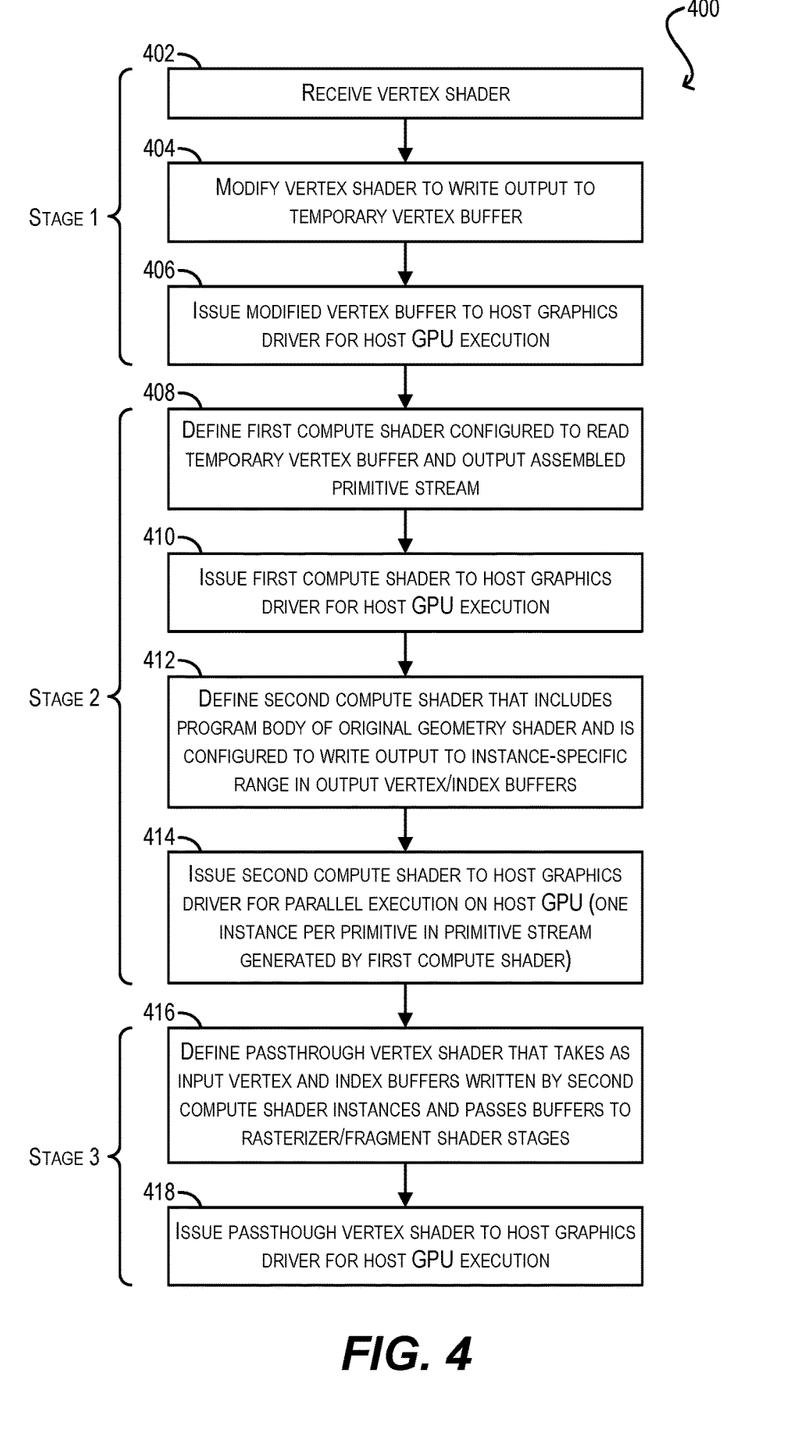
FIG. 4 depicts a geometry shader emulation workflow according to an embodiment.

FIG. 4 depicts a workflow 400 that may be executed by GS/SO emulation module 316 of FIG. 3B for emulating a geometry shader provided by an application (e.g., guest graphics application 202') using one or more compute shaders according to an embodiment. Workflow 400 involves three general stages: (1) vertex shader modification, (2) geometry shader conversion/compute shader execution; and (3) compute shader output passthrough to the rasterizer/fragment shader stage.

Starting with stage (1), at block 402, GS/SO emulation module 316 can receive a vertex shader that has been defined by guest graphics application 202' for execution on virtual GPU 306. As mentioned previously, a vertex shader is a program that takes as input a single vertex, performs some computations (e.g., transformations, lighting, etc.) on the vertex, and then outputs the transformed vertex.

At block 404, GS/SO emulation module 316 can modify the vertex shader such that it writes the output of its computations (i.e., the transformed vertex) into a temporary vertex buffer in host GPU 302's memory that is accessible by the GPU's compute shader stage. Note that in a typical vertex shader, the vertex shader output cannot be read by any GPU component other than the next graphics pipeline stage; thus, the purpose of block 404 is to ensure that the vertex data generated by the vertex shader can be read by the GPU's compute shader hardware (which will consume this data for geometry shader emulation).

Once the vertex shader has been modified, GS/SO emulation module 316 can issue the modified vertex shader to host graphics driver 312 (via an appropriate host graphics API call) for execution on host GPU 302 (block 406).

Turning now to stage (2) (geometry shader conversion/compute shader execution), at the time virtual GPU 306 is ready to execute a geometry shader that has been provided by guest graphics application 202', GS/SO emulation module 316 can define and issue a first compute shader to host graphics driver 312 that is configured to read the temporary vertex buffer written by the vertex shader stage and assemble primitives (e.g., triangles, lines, or points) from that vertex data (blocks 408 and 410). The output of this first compute shader is a primitive stream comprising the assembled primitives and a total primitive count (referred to as numInPrimitives).

Further, at block 412, GS/SO emulation module 316 can define a second compute shader that is based on the content of the geometry shader to be executed. In particular, this second compute shader can include the program body of the geometry shader, as well as some additional code to (1) consume the assembled primitive stream generated by the first compute shader as input, and (2) write the output of the geometry shader computations (i.e., vertex list) to certain output buffers in host GPU memory. GS/SO emulation module 316 can then issue the second compute shader to host graphics driver 312 (block 414) in a manner that causes multiple instances to be executed in parallel on host GPU 302 (one instance per primitive in the primitive stream output by the first compute shader). These multiple second compute shader instances can essentially perform the geometry shading computations that would have been performed by instances of the native geometry shader.

In various embodiments, the GPU output buffers that are written by each second compute shader instance can include the following:

Vertex buffer gsOutVB—contains output vertices generated by geometry shader code Index buffer gsOutIB—contains primitive indices corresponding to the vertices in gsOutVB Vertex count buffer gsOutVertexCount—contains numInPrimitives elements with each element corresponding to a second compute shader instance and including the number of vertices emitted by that instance It should be noted that gsOutVB, gsOutIB, and gsOutVertexCount are shared among all of the second compute shader instances—in other words, they all write their output to a single gsOutVB buffer, a single gsOutIB buffer, and a single gsOutVertexCount buffer. This format is needed because the next stage in the graphics pipeline (i.e., the rasterizer stage) expects the output of the geometry shader stage to be a single stream of vertices and corresponding indices.

One potential problem with having all instances of the second compute shader write to shared output buffers is that each instance may output a variable number of vertices (up to a maximum number that is defined in the geometry shader program). Thus, it can be difficult for each instance to know which portions of the output buffers it should write its output to, since all instances are executed in parallel on the GPU compute shader stage and any given instance will generally not know how many buffer entries will be filled by other instances operating on other prior primitives in the input primitive stream.

To address this problem, as part of defining the second compute shader at block 412, GS/SO emulation module 316 can configure each second compute shader instance to write its output vertices and corresponding indices to specific non-overlapping portions of gsOutVB and gsOutIB that are designated for that instance. For example, in a particular embodiment, each second compute shader instance can be configured to write a buffer index range starting at thread_position_in_grid*maxvertexcount, where thread_position_in_grid corresponds to a unique ID of the instance and maxvertexcount corresponds to the maximum number of vertices that may be emitted by the geometry shader program body. If the second compute shader instance ends up emitting less vertices than maxvertexcount, the instance can pad the remaining entries in its designated range within gsOutIB with a value of −1; this value (known as a primitive restart index) indicates to subsequent stages of the graphics pipeline that the corresponding vertex entries in gsOutVB do not contain real vertex data and thus should not be processed.

Once all of the second compute instances have finished their execution and written their outputs to gsOutVB, gsOutIB, and gsOutVertexCount as described above, stage (2) can end and GS/SO emulation module 316 can move on to stage (3) (i.e., compute shader output passthrough). In particular, at block 416, GS/SO emulation module 316 can define a "pass-through" vertex shader that takes the vertex data in gsOutVB as input and passes this vertex data to the rasterizer/fragment shader stages of host GPU 302's pipeline for further processing. This passthrough vertex buffer is required in certain embodiments because the rasterizer and fragment shader stages cannot directly retrieve compute shader outputs from GPU memory, and thus they need this data to be provided in a structured manner through the graphics pipeline (i.e., from the vertex shader stage). Finally, at block 418, GS/SO emulation module 316 can issue the passthrough vertex shader to host graphics driver 312 for execution on host GPU 302 and workflow 400 can end.

It should be noted that since the second compute shader instances (i.e., emulated geometry shader instances) each write their output in a non-overlapping manner to gsOutVB and gsOutIB, the emulation approach described above advantageously avoids the need for thread synchronization or atomic operations in order to coordinate the execution of these instances; instead each emulated geometry shader instance can operate completely independently. In cases where stream output is disabled, the "gaps" in gsOutVB that are caused by certain instances writing fewer vertices than their maximum allowable vertex count generally will not cause any problems, since the rasterizer/fragment shader stages of the GPU will recognize the primitive restart index in the corresponding entries of gsOutIB and thus will not attempt to retrieve vertex data from those entries.

However, in cases when stream output is enabled and needs to be emulated, the outputs written by the emulated geometry shader instances generally do need to be written to gsOutVB and gsOutIB in a contiguous fashion (i.e., without gaps) due to the requirements of stream output. This problem is addressed in the next section.

It should be appreciated that workflow 400 of FIG. 4 is illustrative and various modifications are possible. For example, rather than modifying the application-defined vertex shader to write its outputs to a temporary vertex buffer and then executing the modified vertex shader via the GPU's vertex shader stage (per blocks 402-406), in some embodiments the vertex shader can be emulated, along with the geometry shader, via the GPU's compute shader stage. In these embodiments, the program body of the vertex shader may be combined with the program body of the geometry shader into a single "super" compute shader, and multiple instances of this super compute shader may be run in parallel on the GPU in order to carry out the operations performed by the native vertex and geometry shaders. With this approach, there is a reduction in GPU memory bandwidth use since there is no need to write the vertex shader outputs to a temporary buffer and then retrieve those outputs again for geometry shading; instead, the vertices generated by the vertex shader code can be operated on directly by the geometry shader code in the single super compute shader.

One of ordinary skill in the art will recognize other variations, modifications, and alternatives for the geometry shader emulation workflow of FIG. 4.

4. Stream Output Emulation

Figure 5:
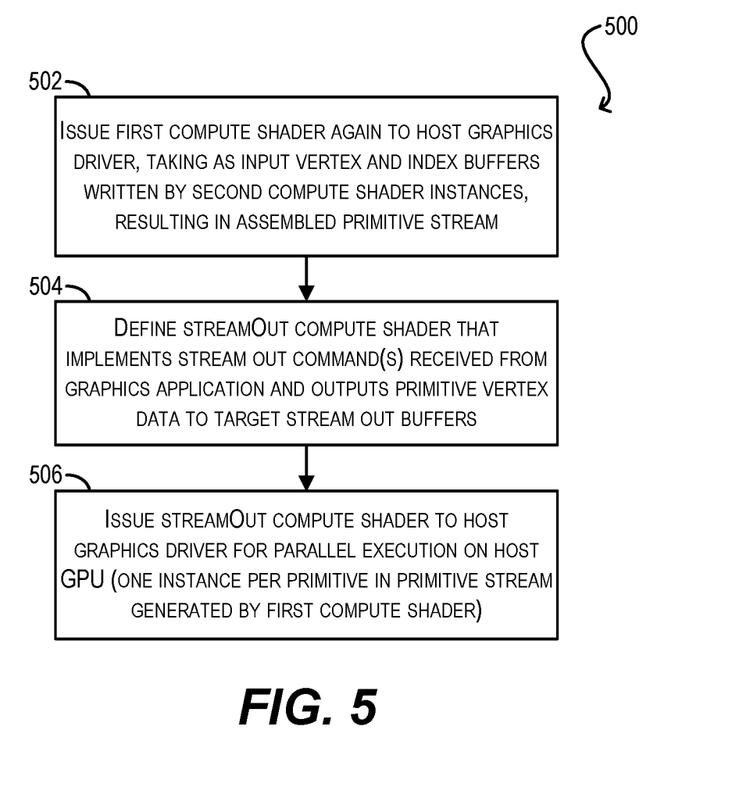
FIG. 5 depicts a stream output emulation workflow according to an embodiment.

There are two possible scenarios with respect to emulating stream output via GS/SO emulation module 316: (1) stream output is enabled after geometry shader emulation as shown in FIG. 4, or (2) stream output is enabled after the vertex shader stage, without any geometry shader emulation. FIG. 5 depicts a workflow 500 that can be executed by GS/SO emulation module 316 for emulating stream output via compute shaders in the case of scenario (1) according to an embodiment.

At block 502, upon completion of geometry shader emulation workflow 400, GS/SO emulation module 316 can again issue the first compute shader described at blocks 408 and 410 of FIG. 4. However, rather than operating on the output of the vertex shader stage, this instance of the first compute shader can operate on the gsOutVB and gsOutIB buffers written by the emulated geometry shader stage. Using these buffers, the first compute shader can assemble primitives and output a primitive stream with a total primitive count.

Then, at blocks 504 and 506, GS/SO emulation module 316 can define a "streamOut" compute shader in accordance with the stream output command(s) received from guest graphics application 202' and can issue this streamOut compute shader for parallel execution on host GPU 302 (one instance per primitive in the primitive stream generated by the first compute shader at block 502). In this way, each streamOut shader can emulate the stream output functionality requested by guest graphics application 202' and can write the primitive vertex data to appropriate stream out target buffer(s) as defined by the application.

As part of this process, as mentioned previously, the streamOut compute shader should ensure that the vertex data is written to the stream out target buffers in a contiguous manner, without any gaps. To achieve this, in certain embodiments the streamOut compute shader can be configured to compute a prefix sum of vertices based on the per-geometry shader instance vertex counts included in gsOutVertexCount buffer. This allows each streamOut shader instance to know which index of the stream output target buffer(s) it should use to write the vertex data for its input primitive without gaps.

In scenario (2) mentioned above where GS/SO emulation module 316 emulates stream output directly after the vertex shader stage (i.e., without geometry shader emulation), module 316 can modify the vertex shader processed in the vertex shader stage to output its transformed vertex to a temporary vertex buffer in a manner similar to block 404 of workflow 400. GS/SO emulation module 316 can then perform workflow 500 of FIG. 5 on the temporary vertex buffer to emulate stream output of that vertex data.

Certain embodiments described herein involve a hardware abstraction layer on top of a host computer. The hardware abstraction layer allows multiple containers to share the hardware resource. These containers, isolated from each other, have at least a user application running therein. The hardware abstraction layer thus provides benefits of resource isolation and allocation among the containers. In the foregoing embodiments, virtual machines are used as an example for the containers and hypervisors as an example for the hardware abstraction layer. As described above, each virtual machine includes a guest operating system in which at least one application runs. It should be noted that these embodiments may also apply to other examples of containers, such as containers not including a guest operating system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in userspace on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O.

Further embodiments described herein can employ various computer-implemented operations involving data stored in computer systems. For example, these operations can require physical manipulation of physical quantities-usually, though not necessarily, these quantities take the form of electrical or magnetic signals, where they (or representations of them) are capable of being stored, transferred, combined, compared, or otherwise manipulated. Such manipulations are often referred to in terms such as producing, identifying, determining, comparing, etc. Any operations described herein that form part of one or more embodiments can be useful machine operations.

Yet further, one or more embodiments can relate to a device or an apparatus for performing the foregoing operations. The apparatus can be specially constructed for specific required purposes, or it can be a general purpose computer system selectively activated or configured by program code stored in the computer system. In particular, various general purpose machines may be used with computer programs written in accordance with the teachings herein, or it may be more convenient to construct a more specialized apparatus to perform the required operations. The various embodiments described herein can be practiced with other computer system configurations including handheld devices, microprocessor systems, microprocessor-based or programmable consumer electronics, minicomputers, mainframe computers, and the like.

Yet further, one or more embodiments can be implemented as one or more computer programs or as one or more computer program modules embodied in one or more non-transitory computer readable storage media. The term non-transitory computer readable storage medium refers to any data storage device that can store data which can thereafter be input to a computer system. The non-transitory computer readable media may be based on any existing or subsequently developed technology for embodying computer programs in a manner that enables them to be read by a computer system. Examples of non-transitory computer readable media include a hard drive, network attached storage (NAS), read-only memory, random-access memory, flash-based nonvolatile memory (e.g., a flash memory card or a solid state disk), a CD (Compact Disc) (e.g., CD-ROM, CD-R, CD-RW, etc.), a DVD (Digital Versatile Disc), a magnetic tape, and other optical and non-optical data storage devices. The non-transitory computer readable media can also be distributed over a network coupled computer system so that the computer readable code is stored and executed in a distributed fashion.

In addition, while described virtualization methods have generally assumed that virtual machines present interfaces consistent with a particular hardware system, persons of ordinary skill in the art will recognize that the methods described can be used in conjunction with virtualizations that do not correspond directly to any particular hardware system. Virtualization systems in accordance with the various embodiments, implemented as hosted embodiments, non-hosted embodiments or as embodiments that tend to blur distinctions between the two, are all envisioned. Furthermore, certain virtualization operations can be wholly or partially implemented in hardware.

Many variations, modifications, additions, and improvements are possible, regardless the degree of virtualization. The virtualization software can therefore include components of a host, console, or guest operating system that performs virtualization functions. Plural instances can be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations can be implemented as a combined structure or component. Similarly, structures and functionality presented as a single component can be implemented as separate components.

As used in the description herein and throughout the claims that follow, "a," "an," and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. These examples and embodiments should not be deemed to be the only embodiments, and are presented to illustrate the flexibility and advantages of particular embodiments as defined by the following claims. Other arrangements, embodiments, implementations and equivalents can be employed without departing from the scope hereof as defined by the claims.

What is claimed is:

1. A method for emulating stream output using compute shaders, the method comprising:
   receiving, by a computer system, a stream output command defined by an application for execution via a stream output stage of a graphics processing unit (GPU) of the computer system, the stream output command instructing the GPU to stream primitive data for one or more input primitives to one or more target buffers in a GPU memory;
   converting, by the computer system, the stream output command into one or more compute shaders, the one or more compute shaders comprising program code for implementing functionality of the stream output command; and
   issuing, by the computer system, the one or more compute shaders to a graphics driver of the computer system for execution via a compute shader stage of the GPU.

2. The method of claim 1 wherein the receiving, the converting, and the issuing are performed by a hypervisor of the computer system, and wherein the stream output command is received by the hypervisor from a guest graphics driver running within a virtual machine (VM) of the computer system.

3. The method of claim 2 wherein the one or more compute shaders are issued by the hypervisor to a host graphics driver of the computer system that is different from the guest graphics driver.

4. The method of claim 1 wherein the stream output command is defined by the application via a first graphics application programming interface (API) that supports stream output, and wherein the one or more compute shaders are issued via a second graphics API that does not support stream output.

5. The method of claim 1 further comprising:
   receiving a geometry shader defined by the application for execution via a geometry shader stage of the GPU, the geometry shader comprising program code for processing the one or more input primitives;
   converting the geometry shader into one or more other compute shaders, the one or more other compute shaders incorporating the program code of the geometry shader; and
   issuing the one or more other compute shaders to the graphics driver of the computer system for execution via the compute shader stage of the GPU.

6. The method of claim 5 wherein converting the geometry shader into the one or more other compute shaders comprises:
   defining a first compute shader that reads a temporary vertex buffer and outputs an assembled primitive stream; and
   defining a second compute shader that includes the program code of the geometry shader.

7. The method of claim 6 wherein converting the stream output command into the one or more compute shaders comprises:
   defining a third compute shader for streaming, to the one or more target buffers, primitive data from the assembled primitive stream output by the first compute shader, wherein multiple instances of the third compute shader are executed in parallel on the GPU, and wherein each instance of the third compute shader processes a separate primitive in the assembled primitive stream.

8. A non-transitory computer readable storage medium having stored thereon instructions executable by a computer system, the instructions embodying a method comprising:
   receiving a stream output command defined by an application for execution via a stream output stage of a graphics processing unit (GPU) of the computer system, the stream output command instructing the GPU to stream primitive data for one or more input primitives to one or more target buffers in a GPU memory;
   converting the stream output command into one or more compute shaders, the one or more compute shaders comprising program code for implementing functionality of the stream output command; and
   issuing the one or more compute shaders to a graphics driver of the computer system for execution via a compute shader stage of the GPU.

9. The non-transitory computer readable storage medium of claim 8 wherein the receiving, the converting, and the issuing are performed by a hypervisor of the computer system, and wherein the stream output command is received by the hypervisor from a guest graphics driver running within a virtual machine (VM) of the computer system.

10. The non-transitory computer readable storage medium of claim 9 wherein the one or more compute shaders are issued by the hypervisor to a host graphics driver of the computer system that is different from the guest graphics driver.

11. The non-transitory computer readable storage medium of claim 8 wherein the stream output command is defined by the application via a first graphics application programming interface (API) that supports stream output, and wherein the one or more compute shaders are issued via a second graphics API that does not support stream output.

12. The non-transitory computer readable storage medium of claim 8 wherein the method further comprises:
- receiving a geometry shader defined by the application for execution via a geometry shader stage of the GPU, the geometry shader comprising program code for processing the one or more input primitives;
- converting the geometry shader into one or more other compute shaders, the one or more other compute shaders incorporating the program code of the geometry shader; and
- issuing the one or more other compute shaders to the graphics driver of the computer system for execution via the compute shader stage of the GPU.

13. The non-transitory computer readable storage medium of claim 12 wherein converting the geometry shader into the one or more other compute shaders comprises:
- defining a first compute shader that reads a temporary vertex buffer and outputs an assembled primitive stream; and
- defining a second compute shader that includes the program code of the geometry shader.

14. The non-transitory computer readable storage medium of claim 13 wherein converting the stream output command into the one or more compute shaders comprises:
- defining a third compute shader for streaming, to the one or more target buffers, primitive data from the assembled primitive stream output by the first compute shader, wherein multiple instances of the third compute shader are executed in parallel on the GPU, and wherein each instance of the third compute shader processes a separate primitive in the assembled primitive stream.

15. A computer system comprising:
- a central processing unit (CPU);
- a graphics processing unit (GPU); and
- a non-transitory computer readable medium having stored thereon instructions that, when executed by the CPU, causes the CPU to:
  - receive a stream output command defined by an application for execution via a stream output stage of the GPU, the stream output command instructing the GPU to stream primitive data for one or more input primitives to one or more target buffers in a GPU memory;
  - convert the stream output command into one or more compute shaders, the one or more compute shaders comprising program code for implementing functionality of the stream output command; and
  - issue the one or more compute shaders to a graphics driver of the computer system for execution via a compute shader stage of the GPU.

16. The computer system of claim 15 wherein the receiving, the converting, and the issuing are performed by a hypervisor of the computer system, and wherein the stream output command is received by the hypervisor from a guest graphics driver running within a virtual machine (VM) of the computer system.

17. The computer system of claim 16 wherein the one or more compute shaders are issued by the hypervisor to a host graphics driver of the computer system that is different from the guest graphics driver.

18. The computer system of claim 15 wherein the stream output command is defined by the application via a first graphics application programming interface (API) that supports stream output, and wherein the one or more compute shaders are issued via a second graphics API that does not support stream output.

19. The computer system of claim 15 wherein the instructions further cause the CPU to:
- receive a geometry shader defined by the application for execution via a geometry shader stage of the GPU, the geometry shader comprising program code for processing the one or more input primitives;
- convert the geometry shader into one or more other compute shaders, the one or more other compute shaders incorporating the program code of the geometry shader; and
- issue the one or more other compute shaders to the graphics driver of the computer system for execution via the compute shader stage of the GPU.

20. The computer system of claim 19 wherein the instructions that cause the CPU to convert the geometry shader into the one or more other compute shaders comprise instructions that cause the CPU to:
- define a first compute shader that reads a temporary vertex buffer and outputs an assembled primitive stream; and
- define a second compute shader that includes the program code of the geometry shader.

21. The computer system of claim 20 wherein the instructions that cause the CPU to convert the stream output command into the one or more compute shaders comprise instructions that cause the CPU to:
- define a third compute shader for streaming, to the one or more target buffers, primitive data from the assembled primitive stream output by the first compute shader, wherein multiple instances of the third compute shader are executed in parallel on the GPU, and wherein each instance of the third compute shader processes a separate primitive in the assembled primitive stream.

* * * * *